US012803364B2

(12) United States Patent
Gloede

(10) Patent No.: US 12,803,364 B2
(45) Date of Patent: Nov. 17, 2026

(54) ELECTRIC DRIVE MACHINE

(71) Applicant: AUDI AG, Ingolstadt (DE)

(72) Inventor: Harald Gloede, Pförring (DE)

(73) Assignee: AUDI AG, Ingolstadt (DE)

( * ) Notice: Subject to any disclaimer, the term of this patent is extended or adjusted under 35 U.S.C. 154(b) by 174 days.

(21) Appl. No.: 18/884,436

(22) Filed: Sep. 13, 2024

(65) Prior Publication Data

US 2025/0132628 A1 Apr. 24, 2025

(30) Foreign Application Priority Data

Oct. 19, 2023 (DE) ......................... 102023128782.6

(51) Int. Cl.

*H02K 5/10* (2006.01)
*H02K 5/20* (2006.01)
*H02K 7/116* (2006.01)
*H02K 9/19* (2006.01)

(52) U.S. Cl.

CPC ............... *H02K 5/10* (2013.01); *H02K 5/203* (2021.01); *H02K 7/116* (2013.01); *H02K 9/19* (2013.01); *H02K 2205/09* (2013.01)

(58) Field of Classification Search

CPC ....... H02K 1/32; H02K 7/116; H02K 2209/00
USPC .................................................. 310/58, 60 R
See application file for complete search history.

(56) References Cited

U.S. PATENT DOCUMENTS

2020/0244143 A1* 7/2020 Kiyooka .................. B60K 1/00
2022/0305892 A1* 9/2022 Ishikawa .................. B60K 1/00

FOREIGN PATENT DOCUMENTS

DE 102008046446 A1 3/2010
DE 102018221202 A1 6/2020
DE 102022105286 A1 9/2022
DE 102021128067 A1 5/2023
WO 2022189091 A1 9/2022

OTHER PUBLICATIONS

Search Report issued on Aug. 1, 2024, in corresponding German Application No. 102023128782.6, 8 pages.

* cited by examiner

*Primary Examiner* — Oluseye Iwarere
*Assistant Examiner* — Minki Chang
(74) *Attorney, Agent, or Firm* — Maier & Maier, PLLC

(57) ABSTRACT

An electric drive machine, having a rotor which is arranged on a rotor shaft rotatable about a rotor axis, a stator which surrounds the rotor radially on the outside, a housing which surrounds the stator radially on the outside, and a drive shaft which is arranged rotatably about a shaft axis in a shaft tunnel. The rotor shaft acts, on a first axial end side, which is covered by a first housing part, on the drive shaft via a gear and the rotor shaft is covered on a second axial end side with a second housing part. The first housing part forms a first cavity on the first end side and the second housing part forms a second cavity on the second end side. The first and second cavities are respectively in fluid-conducting connection with the shaft tunnel.

12 Claims, 3 Drawing Sheets

ELECTRIC DRIVE MACHINE

FIELD

The invention relates to an electric drive machine having a rotor which is arranged on a rotor shaft rotatable about a rotor axis, a stator which surrounds the rotor radially on the outside, a housing which surrounds the stator radially on the outside, and a drive shaft which is arranged rotatably about a shaft axis in a shaft tunnel.

BACKGROUND

During operation of the drive machine, i.e. when the rotor is rotating, it usually pumps air from one axial end side of the rotor shaft to the other axial end side of the rotor shaft (hereinafter also referred to as the A side or B side). The air flows, for example, through the air gap formed between the rotor and the stator. As the drive machine is usually closed at the end by the housing, the air cannot escape and a pressure difference arises between the two sides, i.e. between the A-side and the B-side. Since this pressure difference can lead to functional limitations of the electric drive machine, it is desirable to prevent it. For example, in sealed housings, seals can partially lose their effect in the event of negative pressures. As a result, moisture or dirt can penetrate the housing, for example.

A pressure compensation element in the form of an invertible membrane is known, for example, from DE 10 2008 046 446 A1, which is intended to connect a space region of a gear in a compact drive to a space region for an electric motor in a pressure-compensating manner.

DE 10 2018 221 202 A1 relates to an electric drive with a sealed housing formed from two housing parts. The housing parts are connected to each other via a pressure equalization element. The pressure equalization element is intended to ensure pressure equalization between the environment and the interior of the housing in order to prevent moisture from penetrating into the housing as a result of a reduced sealing effect due to pressure.

WO 2022/189091 A1 discloses a rotor for an electric machine, which has a rotor pack firmly mounted on a hollow rotor shaft. Axially extending channels are formed between the rotor stack and a lateral surface of the rotor shaft, which in turn are supplied with a fluid via an annular channel with a pressure-equalizing effect adjacent to a central cavity of the rotor shaft.

SUMMARY

Against this background, the object of the invention is to provide an electric drive machine with a pressure equalization function in a housing of the drive machine without increasing the number of components to be mounted for this purpose. The housing should provide optimum protection of the components contained therein against external influences, e.g. moisture and dirt. In addition, the drive unit should be inexpensive to manufacture.

It should be noted that the features listed individually in the claims can be combined with one another in any technically meaningful way (even across category boundaries, for example between method and device) and reveal further embodiments of the invention. The description additionally characterizes and specifies the invention, in particular in connection with the figures.

It should also be noted that a conjunction “and/or” used herein between two features and linking them together is always to be interpreted such that in a first embodiment of the subject according to the invention only the first feature may be present, in a second embodiment only the second feature may be present and in a third embodiment both the first and the second feature may be present.

The subject of the invention is an electric drive machine which has a rotor which is arranged on a rotor shaft rotatable about a rotor axis, a stator which surrounds the rotor radially on the outside, a housing which surrounds the stator radially on the outside, and a drive shaft which is arranged rotatably about a shaft axis in a shaft tunnel. The rotor shaft acts on the drive shaft on a first axial end side (also referred to herein as the A side), which is covered by a first housing part, via a gear. In other words, the rotor shaft drives the drive shaft via the gear during operation of the drive machine. On a second axial end side (also referred to herein as the B side), the rotor shaft is covered with a second housing part. On the first axial end side (A side), the first housing part forms a first cavity with the first axial end side. On the second axial end side (B side), the second housing part forms a second cavity with the second axial end side. According to the invention, the first and second cavities are each in fluid-conducting connection with the shaft tunnel.

In a manner known per se, the rotor shaft of the drive machine is rotatably mounted in the housing. This also includes housing parts such as end shields, which can be mounted on the housing in the manner of an axial end cover or can be formed in one piece with the housing. The stator is accommodated in the housing and is held by it. The shaft tunnel is essentially tubular and encloses a cavity in which the drive shaft is rotatably mounted. The shaft tunnel is laterally offset to the rotor shaft.

The first housing part can serve as a gear housing to cover the gear. The second housing part can be designed as a bearing shield for mounting an axial end of the rotor, but is not necessarily limited to this function. The second housing part can also merely serve as a cover for the second axial end.

According to the invention, the shaft tunnel of the drive shaft is used as a pressure equalization channel without the need for additional components (e.g. pressure equalization elements) for this purpose. Permanent pressure equalization between the first and second cavities is ensured via the shaft tunnel, so that pressure differences between the two cavities cannot occur during operation of the drive machine, i.e. during rotation of the rotor. Air pumped by the rotor from the A side to the B side (or vice versa) during operation of the drive unit can flow back unhindered to the cavity on the opposite side via the shaft tunnel.

Furthermore, the housing offers maximum protection of the components accommodated therein (e.g. stator, rotor, drive shaft, bearings of the rotor and drive shaft, electric connections, etc.) against external influences, e.g. moisture and dirt, because no structural changes are made to an outside of the housing, e.g. pressure equalization elements such as a diaphragm or the like are attached to the outside of the housing, in order to implement the pressure equalization function according to the invention, compared to a conventional drive machine. The invention ensures reliable and maintenance-free operation of the drive unit, at least with regard to the pressure equalization function. The technical implementation of the invention is also cost-effective, since no additional components are required to provide the pressure equalization function.

In a preferred embodiment, the shaft axis runs parallel to the rotor axis. This enables short and easy to provide fluid-conducting connections from the first and second cavities to the shaft tunnel, as the shaft tunnel according to this embodiment already partially or even completely bridges a distance between the two cavities in the axial extension of the rotor shaft, i.e. a distance between the A and B sides. It should be noted that a slight deviation from an exact (i.e. ideal) parallelism of the shaft axis and the rotor axis within the meaning of the invention is to be included within a tolerance range which the skilled person working in the present field considers to be usual. This is to be understood as a tolerance range of the relevant size with a deviation from an ideal size up to a maximum of +/−20%, preferably up to a maximum of +/−10%.

In further preferred embodiments, the fluid-conducting connection of the first and second cavities to the shaft tunnel is formed by means of a respective bore, which is made in a housing wall separating the shaft tunnel from the two cavities. This embodiment advantageously dispenses with additional components, for example pipes, hoses or the like, for establishing the fluid-conducting connection.

Still further embodiments provide for the first and second cavities to be in fluid-conducting communication via a coolant channel. The coolant channel is used to convey a coolant, such as oil, in order to dissipate heat generated on the rotor and/or stator during operation of the drive machine. For this purpose, the coolant is circulated through the coolant channel in a coolant circuit, which usually comprises a coolant reservoir, and is continuously supplied to the rotor and/or stator. Coolant can collect in the two cavities on the A and B sides, which is fed back into the coolant channel via coolant drains provided in the cavities. The two cavities on the A and B sides are in fluid-conducting contact via the coolant channel and the coolant tank. The coolant channel is permanently flooded with coolant, so that a pressure difference between the two cavities inevitably results in different coolant levels on the A and B sides. Even with small pressure differences, the level of the coolant in the cavities on the A and B sides can vary so greatly without pressure equalization according to the invention that a rotor gap formed between the rotor and the stator can be flooded by the coolant, resulting in significant efficiency losses. However, the permanent pressure equalization between the cavities on the A and B sides, which takes place via the shaft tunnel in accordance with the invention, prevents such an efficiency-impairing operating state of the drive machine.

According to a still further preferred embodiment, the first and second cavities are each designed to accommodate a quantity of coolant up to a predeterminable maximum coolant level, wherein the bore of the fluid-conducting connection to the shaft tunnel is arranged above the corresponding maximum coolant level in each case. This ensures that the pressure equalization channel provided via the shaft tunnel remains dry, as it cannot be flooded by the coolant. The fluid-conducting connection between the cavities on the A and B sides via the shaft tunnel is therefore exclusively an air-conducting connection.

In further advantageous embodiments, the first and second housing parts can each be fastened to the housing in a non-destructive, detachable manner. This simplifies maintenance of the drive machine, e.g. the rotor shaft, the gear, the shaft bearings, electric connections and the like. Furthermore, it is easy to check and, if necessary, clean the fluid-conducting connection of the respective cavity to the shaft tunnel.

BRIEF DESCRIPTION OF THE FIGURES

Further features and advantages of the invention result from the following description of non-limiting embodiments of the invention, which will be explained in more detail below with reference to the drawing. In this drawing in particular.

DETAILED DESCRIPTION

Figure 1:
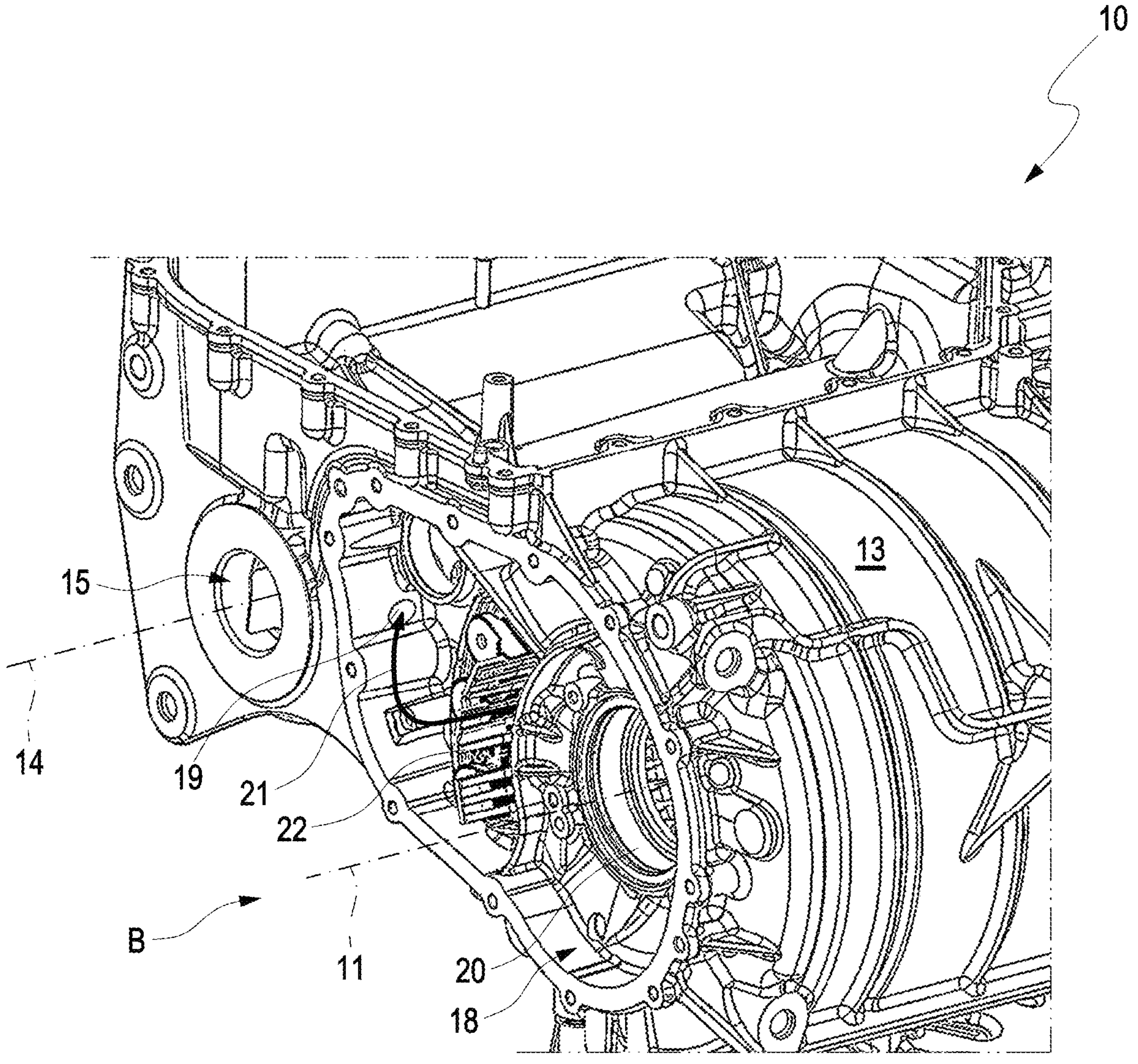
FIG. 1 shows a partial perspective view of an axial end side of a drive machine according to one embodiment of the invention.

In the various figures, parts which are equivalent in terms of their function are always provided with the same reference numerals, so that they are generally only described once.

Figure 2:
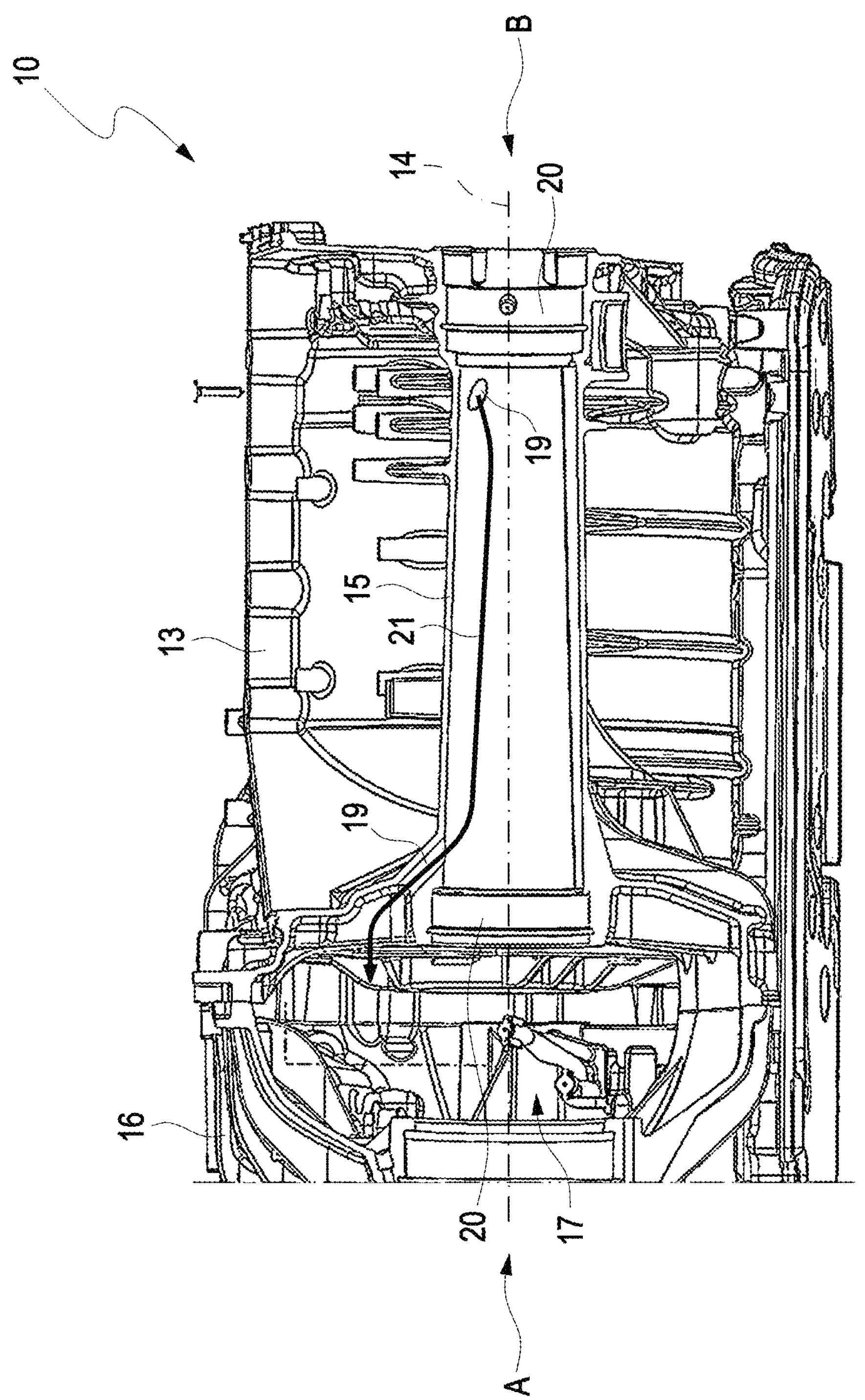
FIG. 2 shows a partially sectional side view of the drive machine from FIG. 1.
Figure 3:
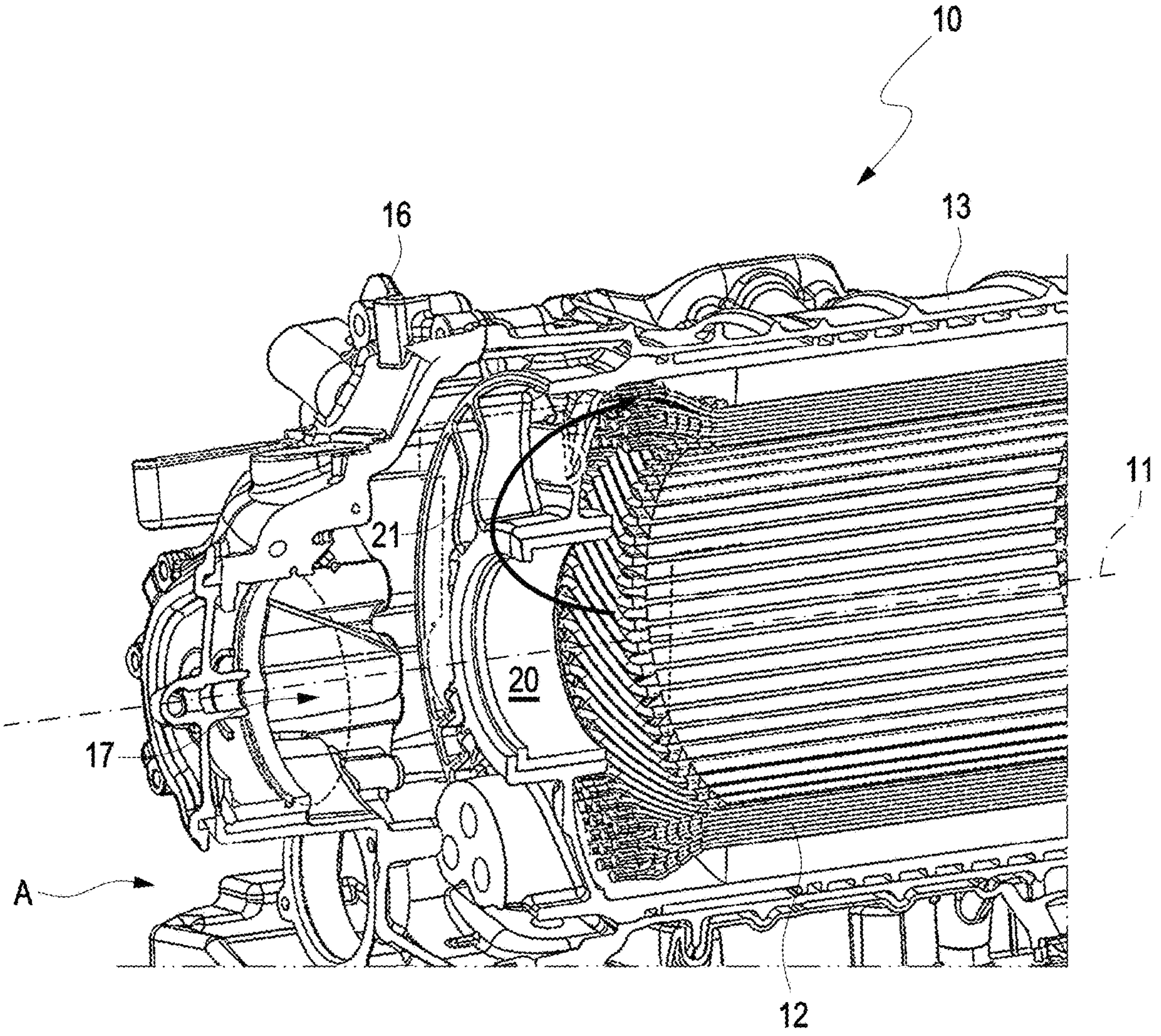
FIG. 3 shows a partial perspective view, sectioned in some regions, of an opposite axial end side of the drive machine from FIG. 1.

In the following description, reference is also made to FIGS. 1 to 3. FIG. 1 schematically shows a partial perspective view of an axial end side B of a drive machine 10 according to one embodiment of the invention. FIG. 2 represents a partially sectioned side view of the drive machine 10 of FIG. 1, and FIG. 3 represents a perspective and partially sectional view of an opposite axial end side A of the drive machine 10 of FIG. 1.

The drive machine 10 has a rotor (not shown), which is arranged on a rotor shaft (also not shown) that can rotate about a rotor axis 11, a stator 12, which surrounds the rotor radially on the outside, a housing 13, which surrounds the stator 12 radially on the outside, and a drive shaft (not shown), which is arranged in a shaft tunnel 15 so that it can rotate about a shaft axis 14. The rotor shaft acts on the drive shaft via a gear (not shown) at the first axial end side A (also referred to herein as the A side for short), which is covered by a first housing part 16. At the second axial end side B (also referred to herein as the B side for short), the rotor shaft is covered by a second housing part (also not shown). At the first end side A, the first housing part 16 forms a first cavity 17 with the axial end side A. At the second end side B, the second housing part forms a second cavity 18 with the axial end side B.

The first and second cavities 17, 18 are each in fluid-conducting connection with the shaft tunnel 15. For this purpose, corresponding bores 19 are provided in a housing wall separating the shaft tunnel 15 from the two cavities 17, 18, in the present case one in the first, A side cavity 17 and one in the second, B side cavity 18. The bores 19 are each arranged above a maximum coolant level (not shown) in the respective cavities 17 and 18, as these are designed in the present exemplary embodiment to each accommodate a quantity of a coolant, which is not shown. The coolant enters the first and second cavities 17 and 18 via a coolant channel, which is also not shown, and serves to cool the rotor and/or stator 12 during operation of the drive machine 10.

During operation of the drive machine 10, air pumped by the rotor from the A side to the B side (or vice versa) can flow back unhindered to the cavity on the opposite side via the shaft tunnel 15.

An example of such an air flow is shown in FIGS. 1 to 3 by flow arrows 21.

In a generally known manner, the rotor shaft of the drive machine 10 is rotatably mounted in the housing 13. For this purpose, the drive machine 10 has corresponding bearing seats 20 on the A and B sides to accommodate bearings for the rotor shaft that are not shown. The drive shaft is also rotatably mounted in the shaft tunnel, wherein corresponding bearings (also not shown) are accommodated in the respective bearing seats 20 of the shaft tunnel.

FIG. 1 shows that the shaft axis 14 of the drive machine 10 shown here runs parallel to the rotor axis 11.

In addition, the first housing part 16 and the second housing part can each be fastened to the housing 13 in a non-destructive and detachable manner. For this purpose, the housing 13 has corresponding threaded holes on the A and B sides, by means of which the two housing parts can each be screwed to the housing 13. Electrical connections 22 for energizing the stator 12 are also arranged in the B side cavity 18.

LIST OF REFERENCE NUMERALS

10 electric drive machine
11 rotor axis
12 stator
13 housing
14 shaft axis
15 shaft tunnel
16 first housing part
17 first cavity
18 second cavity
19 bore
20 bearing seat
21 air flow
22 electric connections
A first axial end side
B second axial end side

The invention claimed is:

1. An electric drive machine, comprising:
a rotor which is arranged on a rotor shaft rotatable about a rotor axis,
a stator which surrounds the rotor radially on the outside,
a housing which surrounds the stator radially on the outside, and
a drive shaft which is arranged rotatably about a shaft axis in a shaft tunnel, wherein:
the rotor shaft is configured to act, on a first axial end side, which is covered by a first housing part, on the rotor shaft via a gear and
the rotor shaft is covered on a second axial end side, opposite to the first axial end side, with a second housing part,
the first housing part forms a first cavity with the first axial end side,
the second housing part forms a second cavity with the second axial end side,
a housing wall separates the shaft tunnel from both the first cavity and the second cavity,
a first bore through the housing wall provides a first fluid-conducting connection between the first cavity and the shaft tunnel, and
a second bore through the housing wall provides a second fluid-conducting connection between the second cavity and the shaft tunnel.

2. The electric drive machine according to claim 1, wherein the shaft axis runs parallel to the rotor axis.

3. The electric drive machine according to claim 2, wherein the first and the second cavities are in fluid-conducting connection via a coolant channel.

4. The electric drive machine according to claim 2, wherein the first and second housing part can each be detachably fastened to the housing in a non-destructive manner.

5. The electric drive machine according to claim 1, wherein the first and the second cavities are in fluid-conducting connection via a coolant channel.

6. The electric drive machine according to claim 5, wherein the first and second cavities are each configured to receive a quantity of a coolant up to a predeterminable maximum coolant level, and each bore is respectively arranged above the corresponding maximum coolant level.

7. The electric drive machine according to claim 5, wherein the first and second housing part can each be detachably fastened to the housing in a non-destructive manner.

8. The electric drive machine according to claim 1, wherein the first and second cavities are each configured to receive a quantity of a coolant up to a predeterminable maximum coolant level, and each bore is respectively arranged above the corresponding maximum coolant level.

9. The electric drive machine according to claim 8, wherein the first and second housing part can each be detachably fastened to the housing in a non-destructive manner.

10. The electric drive machine according to claim 1, wherein the first and second housing part can each be detachably fastened to the housing in a non-destructive manner.

11. The electric drive machine according to claim 1, wherein the first housing part is a gear housing configured to cover the gear.

12. The electric drive machine according to claim 1, wherein the second housing part is a bearing shield configured to mount an axial end of the rotor.

* * * * *